(12) United States Patent
Kim et al.

(10) Patent No.: US 8,148,014 B2
(45) Date of Patent: Apr. 3, 2012

(54) COMPOSITE ANODE ACTIVE MATERIAL, METHOD OF PREPARING THE SAME, AND ANODE AND LITHIUM BATTERY CONTAINING THE MATERIAL

(75) Inventors: Han-su Kim, Yongin-si (KR); Dong-min Im, Yongin-si (KR); Young-su Chung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1100 days.

(21) Appl. No.: 12/022,978

(22) Filed: Jan. 30, 2008

(65) Prior Publication Data

US 2008/0199779 A1     Aug. 21, 2008

(30) Foreign Application Priority Data

Feb. 15, 2007  (KR) .................. 10-2007-0016032

(51) Int. Cl.
*H01M 4/52* (2010.01)
(52) U.S. Cl. ............... 429/223; 429/218.1; 429/231.95
(58) Field of Classification Search .............. 429/223, 429/218.1, 231.95
See application file for complete search history.

(56) References Cited

U.S. PATENT DOCUMENTS 7,820,324 B2 * 10/2010 Mizutani et al. ........... 429/218.1

FOREIGN PATENT DOCUMENTS

| EP | 1 043 789 A1 | 10/2000 |
|---|---|---|
| EP | 1 081 777 A2 | 3/2001 |
| JP | 2004-342459 | 12/2004 |

OTHER PUBLICATIONS

Office action dated Mar. 23, 2011, with English translation, for corresponding Chinese Patent Application No. 200810005692.3.
European Search Report dated Apr. 29, 2008, for corresponding European application 08150568.7.
Idota, et al., "Tin-Based Amorphous Oxide: A High-Capacity Lithium-Ion-Storage Material," Science, vol. 276, May 30, 1997, pp. 1395-1397, and cover sheet of related resources.
Kepler, et al., "$Li_xCu_6Sn_5$ (0<x<13): An Intermetallic Insertion Electrode for Rechargeable Lithium Batteries," Electrochemical and Solid-State Letters, vol. 2, No. 7, (1999) pp. 307-309.
Kim, et al., "The Insertion Mechanism of Lithium into $Mg_2Si$ Anode Material for Li-Ion Batteries," Journal of The Electrochemical Society, vol. 146, No. 12, (1999) pp. 4401-4405.
Mao, et al., "Active/Inactive Nanocomposites as Anodes for Li-Ion Batteries," Electrochemical and Solid-State Letters, vol. 2, No. 1, (1999) pp. 3-5.

* cited by examiner

*Primary Examiner* — Stuart Hendrickson
(74) *Attorney, Agent, or Firm* — Christie, Parker & Hale, LLP

(57) ABSTRACT

A composite anode active material including a transition metal; an intermetallic compound which includes the transition metal as one component and is capable of alloy formation with lithium; and carbon, where both the transition metal and the intermetallic compound have crystallinity, and the transition metal exists in a phase structurally separated from the intermetallic compound capable of alloy formation with lithium, where a content of the transition metal elements as both a metal and a component of the intermetallic compound may be less than 45 wt % based on the total weight of the transition metal and the intermetallic compound capable of alloy formation with lithium. The composite anode active material is a composite anode active material having a new structure, and includes a crystalline intermetallic compound, a crystalline transition metal, and carbon. In addition, an anode and lithium battery prepared using the composite anode active material have excellent charge-discharge characteristics.

20 Claims, 5 Drawing Sheets

COMPOSITE ANODE ACTIVE MATERIAL, METHOD OF PREPARING THE SAME, AND ANODE AND LITHIUM BATTERY CONTAINING THE MATERIAL

CROSS-REFERENCE TO RELATED PATENT APPLICATION

This application claims priority to and the benefit of Korean Patent Application No. 10-2007-0016032, filed on Feb. 15, 2007, in the Korean Intellectual Property Office, the entire content of which is incorporated herein by reference.

BACKGROUND OF THE INVENTION

1. Field of the Invention

The present invention relates to a composite anode active material, a method of preparing the same, and an anode and lithium battery containing the composite anode active material, and more particularly, to a composite anode active material including an intermetallic compound, a transition metal and a carbon composite, a method of preparing the same, and an anode and lithium battery containing the composite anode active material.

2. Description of the Related Art

In an effort to achieve high voltages and energy densities, research and development has been extensively conducted into non-aqueous electrolyte secondary batteries using lithium compounds as anodes. Specifically, metallic lithium has become the subject of intense research due to its ability to impart high initial battery capacity. However, when metallic lithium is used as an anode material, large amount of lithium can deposit on the surface of the anode in the form of dendrites, which may degrade the battery charge and discharge efficiency or cause internal-shorts between the anode and the cathode. Furthermore, lithium is sensitive to heat and impact, and is prone to explosion due to its instability and high reactivity. These problems have tended to limit the commercialization of batteries with metallic lithium. In order to eliminate these problems with the use of metallic lithium, carbonaceous materials have been proposed for use as anode materials. Carbonaceous anodes aid in redox reactions such that lithium ions in an electrolytic solution intercalate/deintercalate in the crystal lattice structure of the carbonaceous material during the charge and discharge cycles. These anodes are referred to as a "rocking chair" type of anodes.

The carbonaceous anode has contributed to the use of lithium batteries by overcoming various disadvantages associated with metallic lithium. However, electronic equipment is becoming smaller and lighter in weight, and the use of portable electronic instruments is becoming more widespread, making the further development of lithium secondary batteries having higher capacities of interest.

Lithium batteries using carbonaceous anodes have low battery capacities because of the porosity of the carbonaceous anodes. For example, graphite, which is a highly crystalline material, when made into a structure in a form of $LiC_6$ by reacting with lithium ions, has a theoretical specific capacity of about 372 mAh/g. This is only about 10% that of metallic lithium, which has a capacity of about 3860 mAh/g. Thus, in spite of many problems with conventional metallic anodes, studies for improving battery capacity using metallic lithium as an anode material are being carried out.

A representative example of such studies is the use of materials that can alloy with lithium, e.g., Si, Sn, Al, or the like, as anode active materials. However, materials that can alloy with lithium, such as Si or Sn, may present several problems, including volumetric expansion during formation of the lithium alloy, creation of electrically disconnected active materials in an electrode, aggravation of electrolytic decomposition due to increases in surface area, and so on.

In order to overcome these problems with the use of such a metallic material, a technique of using a metal oxide exhibiting a relatively low volumetric expansion as an anode active material has been proposed. For example, use of an amorphous Sn-based oxide has been proposed which minimizes the Sn particle size and prevents agglomeration of Sn particles during charge and discharge cycles, thereby leading to improvement of capacity retention characteristics. However, Sn-based oxides unavoidably cause reactions between lithium and oxygen atoms, which is responsible for considerable irreversible capacities.

An intermetallic compound may be utilized between Sn and Si, and Cu, Fe and Mg. The intermetallic compound minimizes the particle size of Sn and Si, and does not induce a reaction of forming $Li_2O$ due to oxygen absence, thereby improving initial efficiency. However, the intermetallic compound undergoes agglomeration because as the cycle number is increased, the sizes of Sn and Si are increased as compared to the initial stage, and thus capacity retention characteristics of the intermetallic compound are gradually degraded.

SUMMARY OF THE INVENTION

An aspect of an embodiment of the present invention is directed toward a composite anode active material that includes a crystalline transition metal, a crystalline intermetallic compound having a transition metal as one component of the crystalline intermetallic compound, and the crystalline intermetallic compound being capable of alloying with lithium, and carbon; where the crystalline transition metal exists in a phase structurally separated from the crystalline intermetallic compound capable of alloying with lithium, and where the transition metal in the crystalline intermetallic compound and the crystalline transition metal is less than 45 wt % based on the total weight of the crystalline transition metal and the crystalline intermetallic compound capable of alloying with lithium.

According to an embodiment of the present invention, the carbon of the composite anode active material exists in intergranular regions of the crystalline intermetallic compound capable alloying with lithium and the crystalline transition metal.

According to an embodiment of the present invention, the crystalline transition metal is Co or Ni; and the crystalline intermetallic compound may include $Sn_2Co$.

In an embodiment of the present invention, a carbon loss spectrum of the composite anode active material is obtained in the range of from about 4.5 eV to about 7 eV and from about 27 eV to about 29 eV in an X-ray photoelectron spectroscopy analysis.

In one embodiment, the transition metal in the crystalline intermetallic compound and the crystalline transition metal is in the range from about 10 to about 45 wt % based on the total weight of the transition metal and the intermetallic compound capable of alloying with lithium. In another embodiment, the carbon can is amorphous.

Another aspect of an embodiment of the present invention is directed toward a method of preparing a composite anode active material, the method includes mechanically milling a metal capable of alloying with lithium and a composite of a transition metal and carbon in an inert atmosphere to form the composite anode active material, where the composite anode active material includes a portion of the transition metal as a crystalline transition metal, a crystalline intermetallic compound including another portion of the transition metal as one component of the crystalline intermetallic compound, the crystalline intermetallic compound being capable of alloying with lithium; and the carbon, where the crystalline transition metal exists in a phase structurally separated from the crystalline intermetallic compound capable of alloying with lithium, and the transition metal in the crystalline intermetallic compound and the crystalline transition metal are less than 45 wt % based on the total weight of the crystalline transition metal and the crystalline intermetallic compound capable of alloying with lithium.

According to an embodiment of the present invention, the metal capable of alloying with lithium and the composite of the transition metal and the carbon are mechanically milling for a time period ranging from about 10 hours to about 30 hours.

In one embodiment, the composite anode active material including the transition metal and the carbon is formed as a sintered resultant of a precursor, where the precursor includes at least one compound that may be selected from the group consisting of cobalt acetylacetonate, cobalt stearate, cobalt acetate, cobalt trimesate, cobalt fumarate, cobalt oxalate, cobalt phthalocyanate, cobalt phthalate, or combinations thereof.

According to an embodiment of the present invention, the carbon is amorphous; and the carbon can exist in intergranular regions of the crystalline intermetallic compound capable alloying with lithium and the crystalline transition metal.

Another aspect of an embodiment of the present invention is directed toward to an anode containing a composite anode active material, the anode includes a crystalline transition metal, a crystalline intermetallic compound comprising a transition metal as one component of the crystalline intermetallic compound, the crystalline intermetallic compound being capable of alloying with lithium; and carbon, where the crystalline transition metal exists in a phase structurally separated from the crystalline intermetallic compound capable of alloying with lithium, and the transition metal in the crystalline intermetallic compound and the crystalline transition metal are less than 45 wt % based on the total weight of the crystalline transition metal and the crystalline intermetallic compound capable of alloying with lithium.

Another aspect of an embodiment of the present invention is directed toward a lithium battery comprising an anode containing an composite anode active material, the lithium battery including a crystalline transition metal, a crystalline intermetallic compound having a transition metal as one component of the crystalline intermetallic compound, the crystalline intermetallic compound being capable of alloying with lithium, and carbon, where the crystalline transition metal exists in a phase structurally separated from the crystalline intermetallic compound capable of alloying with lithium, and the transition metal in the crystalline intermetallic compound and the crystalline transition metal are less than 45 wt % based on the total weight of the crystalline transition metal and the crystalline intermetallic compound capable of alloying with lithium.

In an embodiment of the present invention, the crystalline transition metal comprising incapable of alloying with lithium.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1A:
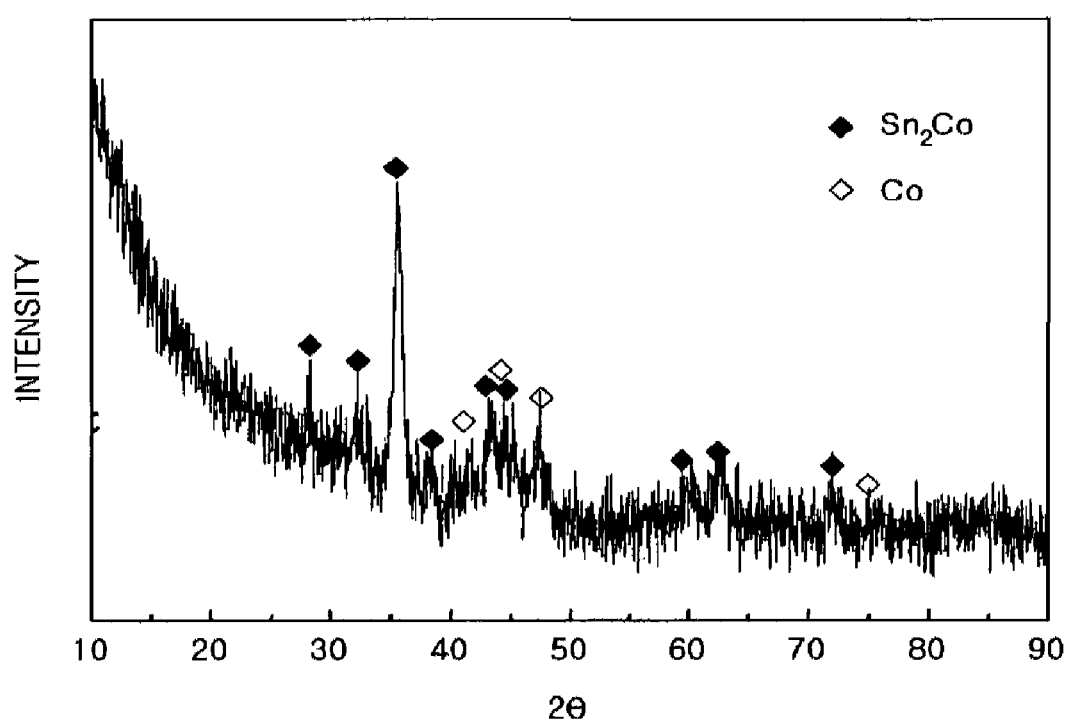
FIGS. 1A, 1B, and 1C are graphs showing X-ray diffraction test results of the composite anode active materials of Examples 1 and 2 and Comparative Example 1, respectively.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

An embodiment of the present invention provides a composite anode active material that includes: a transition metal incapable of alloy formation (or alloying) with lithium; an intermetallic compound that includes the transition metal as one component and is capable of alloy formation with lithium; and carbon, wherein both the transition metal and the intermetallic compound have crystallinity (or are crystalline solids), and the transition metal exists in a phase structurally separated from the intermetallic compound that is capable of alloy formation with lithium. Here, in one embodiment, the content of the transition metal as both the transition metal along with a component of the intermetallic compound is less than about 45 wt % (or less than 45 wt %) based on the total weight of the transition metal and the intermetallic compound in the composite anode active material. In one embodiment, the content of the transition metal is in the range from about 15 wt % to about 45 wt % (or from 15 wt % to about 45 wt %), and, preferably (in one embodiment), in the range from about 40 wt % to about 45 wt % (or from 40 wt % to 45 wt %), based on the total weight of the transition metal and the intermetallic compound in the composite anode active material. In one embodiment, when the content of the transition metal is more than or equal to 45 wt % based on the total weight of the transition metal and the intermetallic compound in the composite anode active material, alloying capacity of the intermetallic compound is reduced.

That is, in the above described embodiments, the transition metal does not form an alloy with both the intermetallic compound and lithium, but the intermetallic compound forms an alloy with lithium.

According to an embodiment of the present invention, the carbon in the composite anode active material exists in intergranular regions of the intermetallic compound and the transition metal, and does not exist on a surface of the composite anode active material. That is, the carbon mainly exists at an interface between the intermetallic compound and the transition metal inside the composite anode active material and does not exist on the surface of the composite anode active material.

According to another embodiment of the present invention, the transition metal in the composite anode active material may be Co, Ni, or the like, and the intermetallic compound in the composite anode active material may be $Sn_2Co$.

According to another embodiment of the present invention, a carbon loss spectrum of the composite anode active material in X-ray photoelectron spectroscopic analysis may be obtained in the ranges from about 4.5 eV to about 7 eV and from about 27 eV to about 29 eV (or from 4.5 eV to 7 eV and from 27 eV to 29 eV).

In addition, according to another embodiment of the present invention, the carbon in the composite anode active material may be amorphous. The fact that the carbon is amorphous can be seen from the X-ray diffraction test shown in FIG. 1A and the X-ray photoelectron spectrum test shown in FIG. 2.

An embodiment of the present invention also provides a method of preparing the composite anode active material. Here, the method includes mechanically milling a metal capable of alloy formation with lithium and a composite of a transition metal and carbon, in an inert atmosphere.

Here, the composite anode active material includes an intermetallic metal capable of alloy formation with lithium, a transition metal, and carbon that are broken into pieces by the mechanical milling and rebounded to form the composite.

According to an embodiment of the method of the present invention, a time taken in the mechanical milling operation may range from about 10 hours to about 30 hours (or from 10 hours to 30 hours). In one embodiment, when the time of the mechanical milling is greater than 30 hours, a crystalline intermetallic compound and a crystalline transition metal are not obtained. In another embodiment, when the time of the mechanical milling is less than 10 hours, tin-transition metal oxides are not synthesized.

According to another embodiment of the method of the present invention, the composite anode active material including the transition metal and the carbon may be a sintered resultant of a precursor. The precursor may be cobalt acetylacetonate, cobalt stearate, cobalt acetate, cobalt trimesate, cobalt fumarate, cobalt oxalate, cobalt phthalocyanate, cobalt phthalate, mixtures thereof, and/or the like.

Further, an embodiment of the present invention also provides an anode and lithium battery using the composite anode active material. More particularly, the anode according to an embodiment of the present invention is prepared by using the composite anode active material described above.

In one embodiment of the present invention, the anode is prepared by, for example, forming a mixed anode material including the composite anode active material and a binder into a shape that may be predetermined or by applying the mixed anode material on a current collector such as a copper foil.

More specifically, an anode composition may be prepared and then directly coated on a copper foil current collector or cast on a separate support body, and then a porous anode active material film stripped from the support body is laminated on the copper foil current collector thereby obtaining an anode plate. The anode of the present invention is not limited to the illustrated examples and many other suitable modifications may be made while still being included in the scope of the invention.

To attain higher capacity batteries, a large amount of current is charged and discharged in the higher capacity batteries, which requires a low resistance material to be used as an electrode material. Thus, in order to reduce the resistance of the electrode, a variety of conductive materials is generally added. Carbon black, or graphite fine particles can be used as the conductive material.

A lithium battery according to an embodiment of the present invention includes the anode. The lithium battery according to the present invention is prepared in the following manner.

First, a cathode active material, a conductive agent, a binder, and a solvent are mixed to prepare a cathode active material composition. The cathode active material composition is directly coated on a metallic current collector and dried to prepare a cathode plate. In an alternative embodiment, the cathode active material composition is cast on a separate support body and peeled off from the support body to obtain a cathode active material film. Then, the cathode active material film is laminated on the metallic current collector.

A suitable lithium-containing metal oxide may be used as the cathode active material. Examples of the lithium-containing metal oxide include $LiCoO_2$, $LiMn_xO_{2x}$ (x=2), $LiNi_{x-1}Mn_xO_{2x}$ (x=1, 2), $Li_{1-x-y}Co_xMn_yO_2$ (0≦x≦0.5, 0≦y≦0.5). Specific examples of the lithium-containing metal oxide are compounds capable of oxidizing and reducing lithium ions, such as $LiMn_2O_4$, $LiCoO_2$, $LiNiO_2$, $LiFeO_2$, $V_2O_5$, TiS, MoS, or the like. In one embodiment, carbon black is used as the conductive agent. Examples of the binder include a vinylidene fluoride/hexafluoropropylene copolymer, polyvinylidene difluoride (PVDF), polyacrylonitrile, polymethylmethacrylate, polytetrafluoroethylene, mixtures of these materials, and a styrene butadiene rubber polymer. As the solvent, N-methyl-pyrrolidone, acetone, water, or the like, may be used. Here, suitable amounts of the cathode electrode active material, the conductive agent, the binder, and the solvent used in the manufacture of the lithium battery are utilized.

A suitable separator for lithium batteries may be used in forming a lithium battery. In one embodiment, the separator has low resistance to migration of ions in an electrolyte and has a high electrolyte-retaining ability. Examples of the separator include glass fiber, polyester, Tefron, polyethylene, polypropylene, polytetrafluoroethylene (PTFE), combinations thereof, and a material which may be in non-woven or woven fabric form. In particular, a windable separator including polyethylene, polypropylene or the like can be used for a lithium ion battery. A separator that can retain a large amount of an organic electrolytic solution may be used for a lithium-ion polymer battery. A method of forming these separators will now be described in more detail.

A polymer resin, a filler and a solvent are mixed to prepare a separator composition. The separator composition is directly coated on the electrode, and then dried to form a separator film. Alternately, the separator composition can be cast onto a separate support, dried, detached from the separate support, and finally laminated on an upper portion of the electrode, thereby forming a separator film.

A suitable polymer resin is used for binding electrode plates in the lithium batteries. Examples of the polymer resin include vinylidenefluoride/hexafluoropropylene copolymer, polyvinylidenefluoride, polyacrylonitrile, polymethylmethacrylate and mixtures thereof.

In the electrolyte solution, the solvent can be a solvent selected from the group consisting of propylene carbonate, ethylene carbonate, diethyl carbonate, ethylmethyl carbonate, methylpropyl carbonate, butylene carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobebzene, dimethyl carbonate, methylethyl carbonate, diethyl carbonate, methylpropyl carbonate, methylisopropyl carbonate, ethylpropyl carbonate, dipropyl carbonate, dibutyl carbonate, diethylene glycol, dimethyl ether, and mixtures thereof. The electrolyte that is used in an embodiment of the present invention is a lithium salt in an electrolyte solvent, such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where x and y are independently a natural number), LiCl, LiI, or a mixture of at least two of the materials.

The separator is interposed between the cathode electrode and the anode electrode to form the electrode assembly. The electrode assembly is wound or folded and then sealed in a cylindrical or rectangular battery case. Then, an organic electrolyte solution is injected into the battery case to complete preparation of a lithium ion battery.

Alternatively, a plurality of electrode assemblies may be stacked in a bi-cell structure and impregnated into an organic electrolyte solution. The resultant is put into a pouch and hermetically sealed, thereby completing a lithium ion polymer battery.

Figure 4:
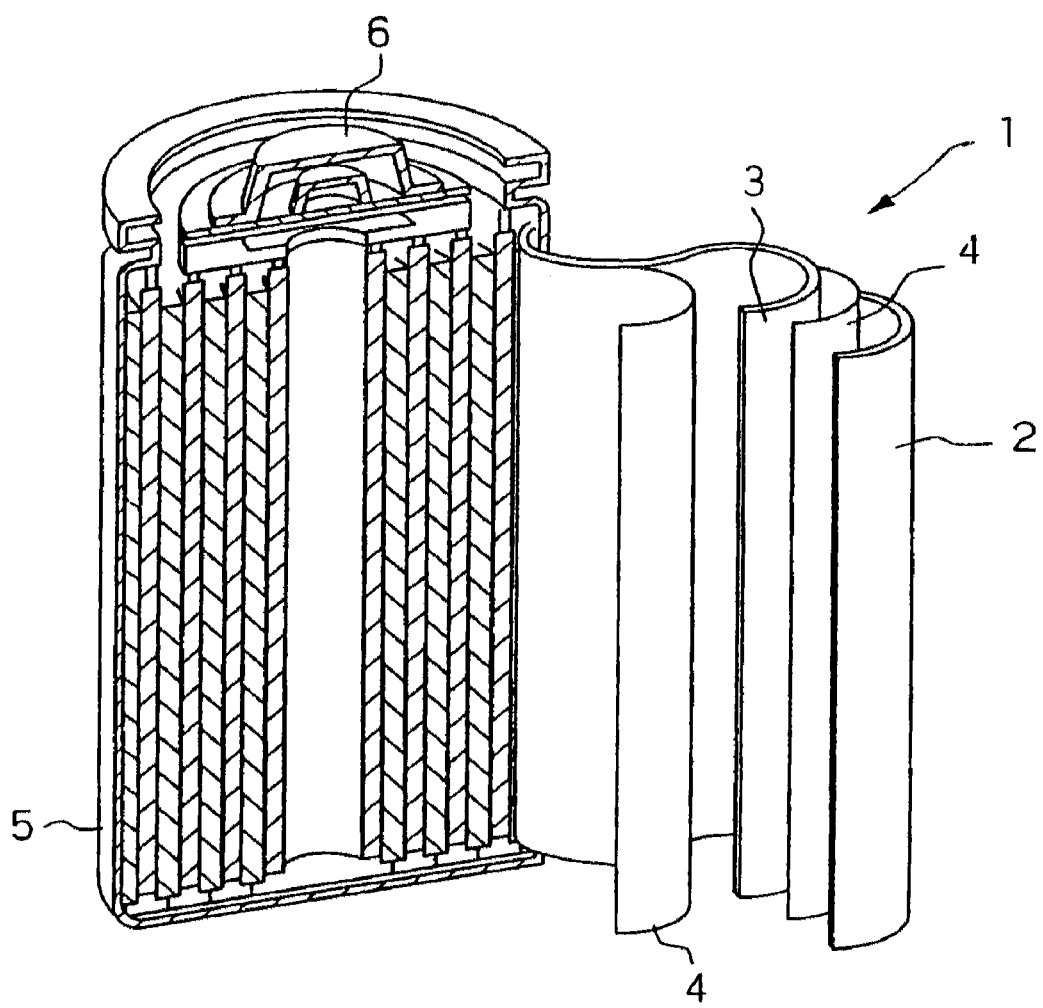
FIG. 4 illustrates a lithium battery prepared according to an embodiment of the present invention.

Referring to FIG. 4, a lithium battery according to an embodiment of the present invention is illustrated. The lithium battery 1 comprises an anode 2, a cathode 3 and a separator 4 positioned between the cathode 3 and the anode 2 to form an electrode assembly. The electrode assembly is wound and enclosed in a battery case 5. Then, the electrolyte solution is injected into the battery case 5 and the battery case is sealed with a cap 6. However, while a can-type battery of a cylindrical shape is disclosed, other types and shapes of batteries are contemplated.

The present invention will be described in more detail with reference to the following examples. However, these examples are for illustrative purposes only and are not intended to limit the scope of the present invention.

Preparation of Composite Anode Active Material

Preparation Example 1

1 g of cobalt trimesate was heat treated at 900° C. for 1 hour in an argon atmosphere to be completely carbonated. Subsequently, the resultant was broken into pieces using a mortar to obtain a composite material.

Example 1

1.5 g of Sn and 1.5 g of a cobalt-carbon composite material having a weight ratio of cobalt to carbon which was 78:22 were put into a stainless steel container with metal balls and milled at 500 rpm for 20 hours. Here, a total weight of the metal balls was made 20 times heavier than a total weight of Sn and the cobalt-carbon composite material, and the mill used was a vibrating mill (Jeongseok Engineering Co., Ltd, Korea).

Example 2

A composite anode active material was prepared in the same (or substantially the same) manner as in Example 1, except that a weight ratio of cobalt to carbon of the cobalt-carbon composite material used in the preparation of the composite anode active material was 68:32.

Example 3

A composite anode active material was prepared in the same (or substantially the same) manner as in Example 1, except that a weight ratio of cobalt to carbon of the cobalt-carbon composite material used in the preparation of the composite anode active material was 50:50.

Example 4

A composite anode active material was prepared in the same (or substantially the same) manner as in Example 1, except that a weight ratio of cobalt to carbon of the cobalt-carbon composite material used in the preparation of the composite anode active material was 82:18.

Comparative Example 1

A composite anode active material was prepared in the same (or substantially the same) manner as in Example 1, except that the milling time was extended to 30 hours.

Evaluation Example 1

Measurement of XRD (X-ray Diffraction)

X-ray diffraction tests of the composite anode active materials prepared in Examples 1 and 2 and Comparative Example 1 were carried out. The test results of the materials of Examples 1 and 2 and Comparative Example 1 are respectively shown in FIGS. 1A, 1B and 1C.

Figure 1B:
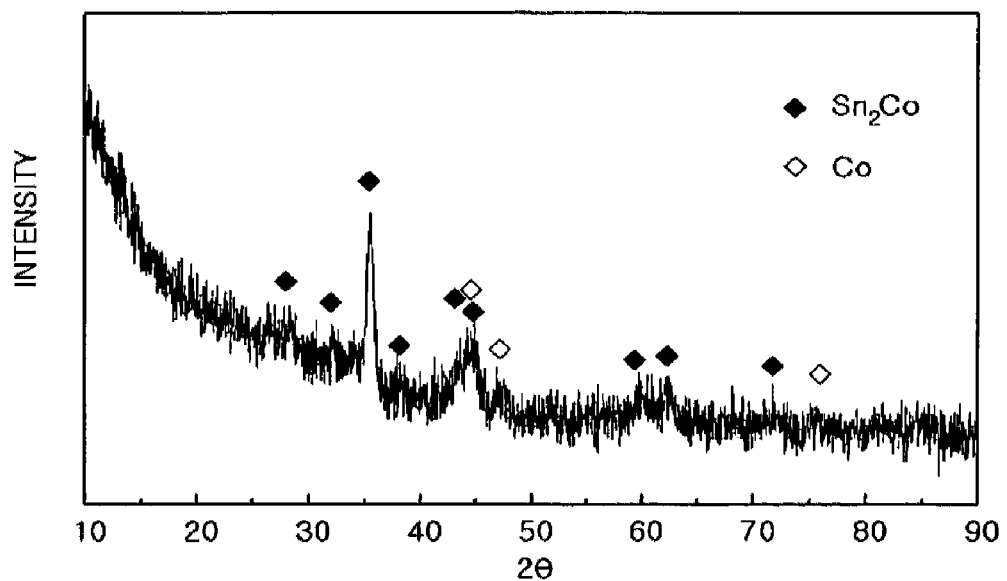

It can be seen from FIGS. 1A and 1B, in the composite anode active materials prepared in Examples 1 and 2, $Sn_2Co$ and Co have crystallinity (are crystalline solids) due to the existence of a characteristic peak of each of $Sn_2Co$ and Co. On the other hand, a characteristic peak with respect to carbon did not exist. From the result, it can be seen that carbon is an amorphous solid.

Therefore, it can be seen that the composite anode active material of an embodiment of the present invention is a composite comprising a crystalline $Sn_2Co$ solid, a crystalline Co solid, and a carbon amorphous solid, regardless of a weight ratio of each component of the material.

Figure 1C:
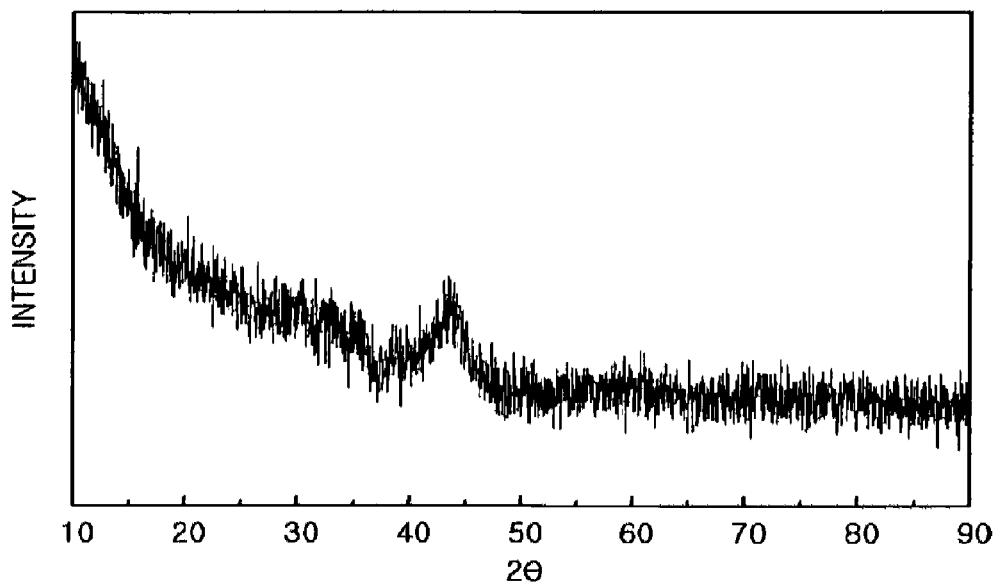

In addition, as shown in FIG. 1C, a crystalline compound could not be confirmed in the composite anode active material of Comparative Example 1. Accordingly, it can be seen that the composite anode active material of Comparative Example 1 was an amorphous Sn—Co—C composite material (or an amorphous Sn—Co—C composite solid).

Evaluation Example 2

Measurement of X-ray Photoelectron Spectrum (XPS)

An X-ray photoelectron spectrum (XPS) experiment was carried out on samples of the composite anode active material of Example 1, wherein one of the samples was heat treated at 120° C. for 12 hours in a vacuum and the other sample were not heat treated. The device used was model Q2000 manufactured by PHI Co., Ltd. An X-ray source was a mono Al k 1486.6 eV. The results are shown in FIG. 2.

The heat treatment was performed in order to confirm whether carbon present in air contaminated the composite anode active material. As can be seen from FIG. 2, the result of the XPS analysis on the sample which had been heat treated, labeled as after heat treatment, was the same (or substantially the same) as that of the sample which had not been heat treated. Thus, it was confirmed that the composite anode material was not contaminated by the carbon present in air.

Figure 2:
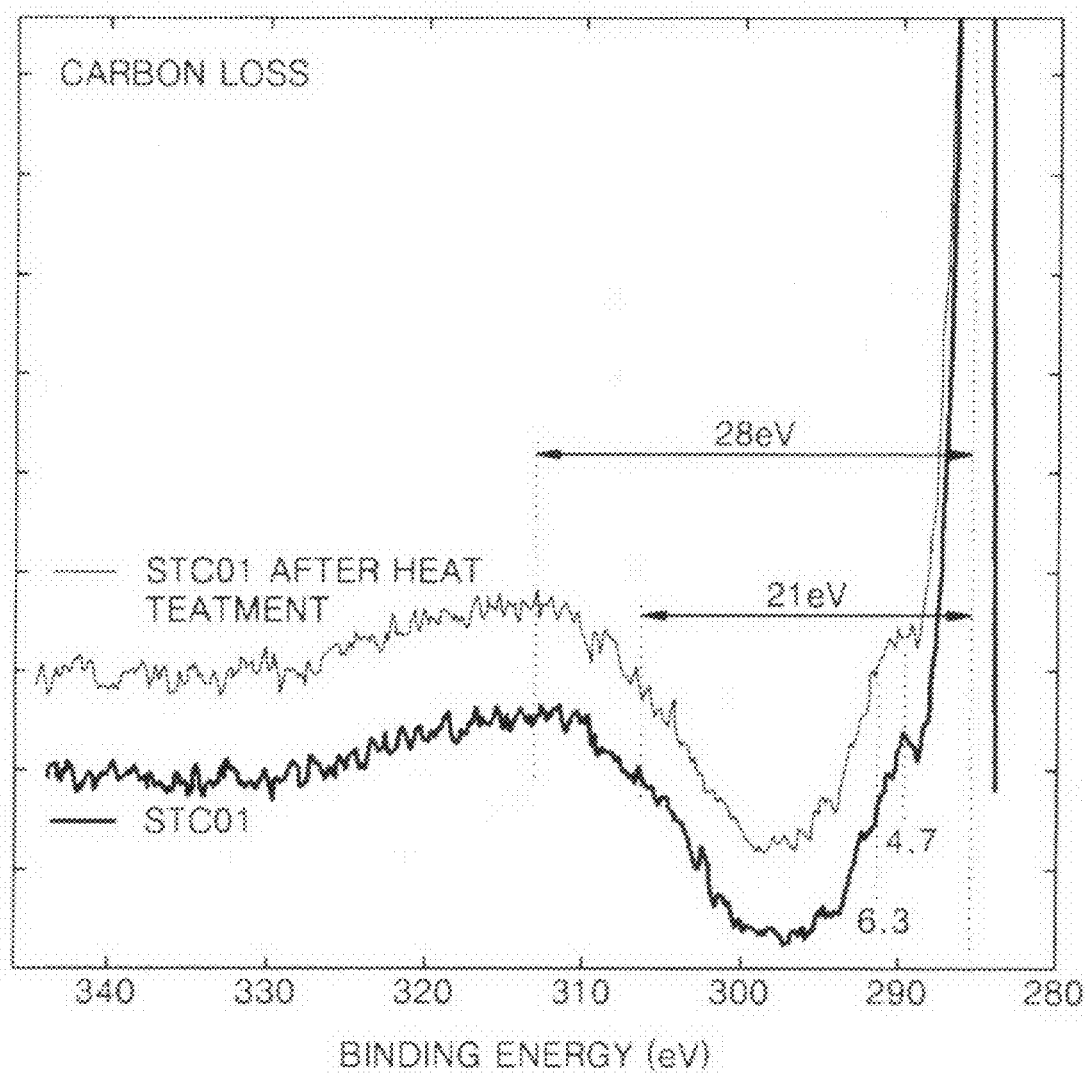
FIG. 2 is a graph showing an X-ray photoelectron test result of the composite anode active material of Example 1.

As shown in FIG. 2, a carbon loss spectrum was obtained in the range of from 4.5 eV to 7 eV and from 27 eV to 29 eV.

The carbon loss spectrum obtained in the range of from 27 eV to 29 eV represents that carbon does not exist as carbide or hydrocarbons, and exists as pure carbon such as graphite, diamond, or the like. The carbon loss spectrum obtained in the range of from 4.5 eV to 7 eV corresponds to values obtained from π plasmon. From this, it can be seen that only carbon exists in the composite anode active material.

Evaluation Example 3

Measurement of Raman Spectrum

A Raman spectrum of the composite anode active material of Example 1 was measured. From the measurement, a peak in the range of from 1250 cm$^{-1}$ to 1700 cm$^{-1}$ corresponding to carbon was not found. Taking into consideration that Raman spectroscopy can analyze a region that is located only within 1 μm depth from a surface of particles, it seemed that the carbon in the composite anode active material mainly exists in the intergranular regions of $Sn_2Co$ and Co, rather than on the surface of particles.

Preparation of Anode

Example 5

The composite anode active material prepared in Example 1, graphite powder (SFG-6, Timcal, Inc.), and polyvinylidene fluoride (PVDF, 5 wt %) were mixed in a weight ratio of 80:10:10, and then the mixture was added to N-methyl pyrrolidone (NMP) to prepare a slurry.

The slurry was coated on a Cu foil using a doctor blade to a thickness of about 50 μm. Subsequently, the Cu foil coated with the slurry was dried in vacuum at 120° C. for 2 hours to prepare an anode.

Example 6

An anode was prepared in the same (or substantially the same) manner as in Example 5, except that the composite anode active material of Example 2 was used instead of the composite anode active material of Example 1.

Example 7

An anode was prepared in the same (or substantially the same) manner as in Example 5, except that the composite anode active material of Example 3 was used instead of the composite anode active material of Example 1.

Example 8

An anode was prepared in the same (or substantially the same) manner as in Example 5, except that the composite anode active material of Example 4 was used instead of the composite anode active material of Example 1.

Comparative Example 2

An anode was prepared in the same (or substantially the same) manner as in Example 5, except that the composite anode active material prepared in Comparative Example 1 was used instead of the composite anode active material of Example 1.

Preparation of Lithium Battery

Example 9

A CR2016-standard coin cell was prepared using the anode prepared in Example 5, a counter electrode made of a lithium metal, a PTFE separator (Cellgard 3510), and an electrolyte solution including 1.3 M $LiPF_6$ melted in a mixture of ethylene carbonate (EC) and diethyl carbonate (DEC) (weight ratio of 3:7).

Examples 10 Through 12 and Comparative Example 3

Coin cells were prepared in the same (or substantially the same) manner as in Example 9, except that the anodes prepared in Examples 6 through 8 and Comparative Example 2 were used instead of the anode of Example 5.

Charge-Discharge Test

The coin cells prepared according to Examples 9 through 12 and Comparative Example 3 were each charged with a constant current of 500 mA per 1 g of anode active material included until the voltage of the cell reached 0.001 V against a Li electrode. Then, the coin cells were each charged with a constant voltage of 0.001 V against the Li electrode until the current of the cell reached 5 mA per 1 g of anode active material. After about 30 minute rest time, the charged cells were discharged at a current of 50 mA per 1 g of anode active material until the voltage of the cell reached 1.5 V against the Li electrode, thereby obtaining discharge capacities. The charge-discharge tests were repeated for 50 cycles. The discharge capacity of each cycle was measured and a capacity retention was calculated using the measured discharge capacity. The capacity retention was calculated using Equation 1 below.

Capacity retention(%)=$50^{th}$ cycle discharge capacity/$1^{st}$ cycle discharge capacity×100    Equation 1

The charge-discharge test results of the coin cells prepared in Examples 9 through 12 and Comparative Example 3 are shown in Table 1 below and FIG. 3.

TABLE 1

| battery | Initial capacity (mAh/cc) | 1st cycle discharge capacity (mAh/cc) | $50^{th}$ cycle discharge capacity (mAh/cc) | Capacity retention (%) |
|---|---|---|---|---|
| Example 9 | 1250 | 1250 | 1200 | 96 |
| Example 10 | 1150 | 1150 | 1127 | 98 |
| Example 11 | 1320 | 1320 | 1254 | 95 |
| Example 12 | 1080 | 1080 | 1026 | 95 |
| Comparative Example 3 | 1040 | 1040 | 644.8 | 62 |

Figure 3:
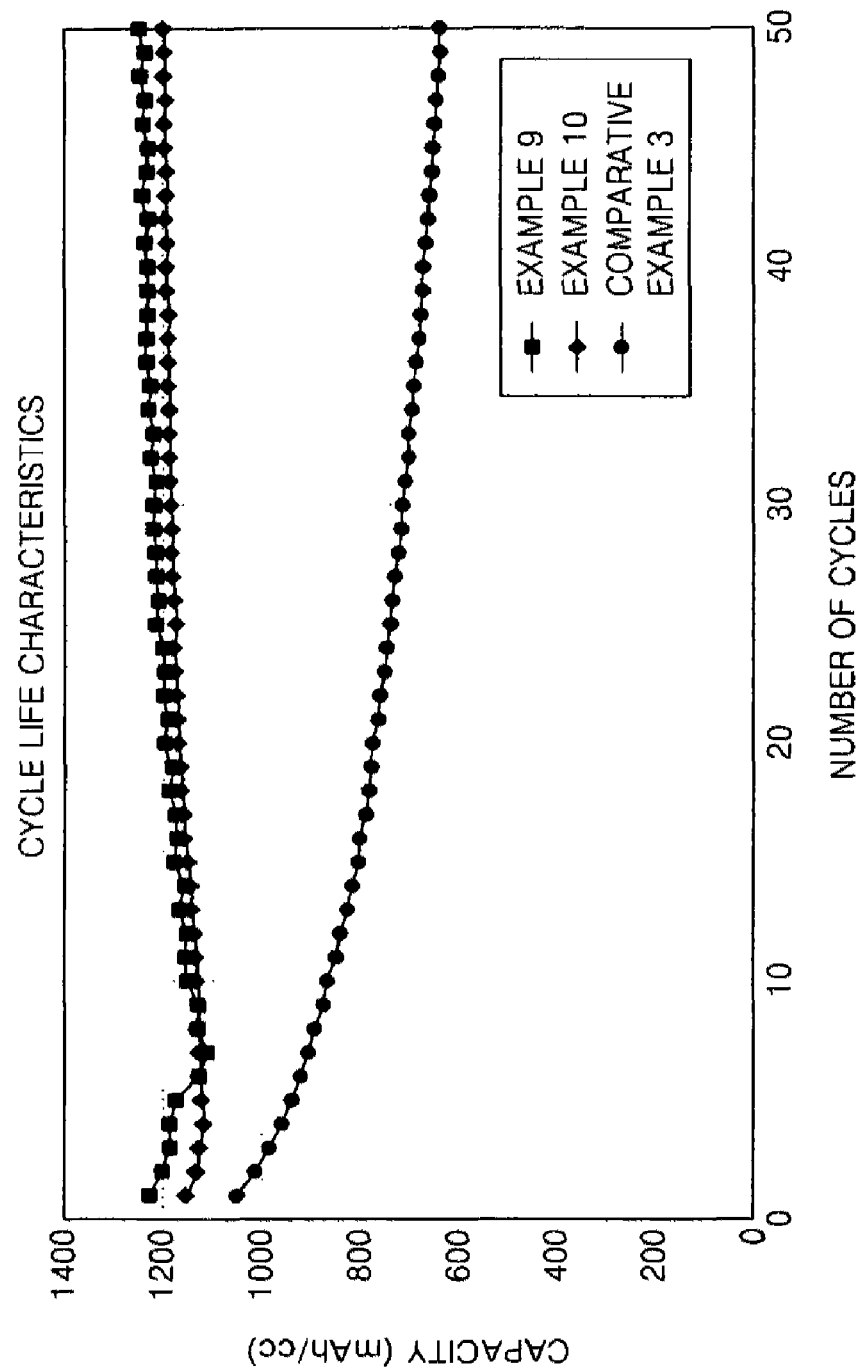
FIG. 3 is a graph showing charge-discharge test results of the lithium batteries of Examples 9 and 10 and Comparative Example 3.

As can be seen in Table 1 and FIG. 3, the discharge capacities of lithium in the case of the batteries using the crystalline composite anode active material according to examples of the present invention were higher as compared to the battery of Comparative Example 3 using the amorphous composite anode active material of Comparative Example 1, and capacity retention in the $50^{th}$ cycle was also significantly increased. This represents a possibility of significant improvement on lifetime of the batteries.

In view of the foregoing, the composite anode active material according to an embodiment of the present invention is a composite anode active material that includes a crystalline intermetallic compound, a crystalline transition metal, and carbon. In addition, an anode and lithium battery prepared using the composite anode active material have relatively high charge-discharge characteristics.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A composite anode active material comprising:
   a crystalline transition metal;
   a crystalline intermetallic compound comprising the same transition metal of the crystalline transition metal as one component of the crystalline intermetallic compound, the crystalline intermetallic compound being capable of alloying with lithium; and
   carbon,
   wherein the crystalline transition metal exists in a phase structurally separated from the crystalline intermetallic compound capable of alloying with lithium, and
   wherein the transition metal in the crystalline intermetallic compound and the crystalline transition metal are less than 45 wt % based on the total weight of the crystalline transition metal and the crystalline intermetallic compound capable of alloying with lithium.

2. The composite anode active material of claim 1, wherein the carbon exists in intergranular regions of the crystalline intermetallic compound capable of alloying with lithium and the crystalline transition metal.

3. The composite anode active material of claim 1, wherein the crystalline transition metal is Co or Ni.

4. The composite anode active material of claim 1, wherein the crystalline intermetallic compound is $Sn_2Co$.

5. The composite anode active material of claim 1, wherein a carbon loss spectrum of the composite anode active material is obtained in the range of from about 4.5 eV to about 7 eV and from about 27 eV to about 29 eV in an X-ray photoelectron spectroscopy analysis.

6. The composite anode active material of claim 1, wherein, in the composite anode active material, the transition metal in the crystalline intermetallic compound and the Crystalline transition metal are in the range from about 10 to about 45 wt % based on the total weight of the transition metal and the intermetallic compound capable of alloying with lithium.

7. The composite anode active material of claim 1, wherein the carbon is amorphous.

8. A method of preparing a composite anode active material, the method comprising:
   mechanically milling a metal capable of alloying with lithium and a composite of a transition metal and carbon, in an inert atmosphere to form the composite anode active material, the composite anode active material comprising:
     a portion of the transition metal as a crystalline transition metal;
     a crystalline intermetallic compound comprising another portion of the transition metal as one component of the crystalline intermetallic compound, the crystalline intermetallic compound being capable of alloying with lithium; and
     the carbon,
   wherein the crystalline transition metal exists in a phase structurally separated from the crystalline intermetallic compound capable of alloying with lithium, and
   wherein the transition metal in the crystalline intermetallic compound and the crystalline transition metal are less than 45 wt % based on the total weight of the crystalline transition metal and the crystalline intermetallic compound capable of alloying with lithium.

9. The method of claim 8, wherein the metal capable of alloying with lithium and the composite of the transition metal and the carbon are mechanically milled for a time period ranging from about 10 hours to about 30 hours.

10. The method of claim 8, wherein the composite anode active material comprising the transition metal and the carbon is formed as a sintered resultant of a precursor.

11. The method of claim 10, wherein the precursor comprises at least one compound selected from the group consisting of cobalt acetylacetonate, cobalt stearate, cobalt acetate, cobalt trimesate, cobalt fumarate, cobalt oxalate, cobalt phthalocyanate, cobalt phthalate, and combinations thereof.

12. The method of claim 8, wherein the carbon exists in intergranular regions of the crystalline intermetallic compound capable of alloying with lithium and the crystalline transition metal.

13. The method of claim 8, wherein the crystalline transition metal is Co or Ni.

14. The method of claim 8, wherein the crystalline intermetallic compound is $Sn_2Co$.

15. The method of claim 8, wherein a carbon loss spectrum of the composite anode active material is obtained in the range of from about 4.5 eV to about 7 eV and from about 27 eV to about 29 eV in an X-ray photoelectron spectroscopy analysis.

16. The method of claim 8, wherein, in the composite anode active material, the transition metal in the crystalline intermetallic compound and the crystalline transition metal are in the range from about 10 to about 45 wt % based on the total weight of the transition metal and the intermetallic compound capable of alloying with lithium.

17. The method of claim 8, wherein the carbon is amorphous.

18. An anode containing a composite anode active material, the anode comprising:
   a crystalline transition metal;
   a crystalline intermetallic compound comprising the same transition metal of the crystalline transition metal as one component of the crystalline intermetallic compound, the crystalline intermetallic compound being capable of alloying with lithium; and
   carbon,
   wherein the crystalline transition metal exists in a phase structurally separated from the crystalline intermetallic compound capable of alloying with lithium, and
   wherein the transition metal in the crystalline intermetallic compound and the crystalline transition metal are less than 45 wt % based on the total weight of the crystalline transition metal and the crystalline intermetallic compound capable of alloying with lithium.

19. A lithium battery comprising an anode containing a composite anode active material, the lithium battery comprising:
   a crystalline transition metal;
   a crystalline intermetallic compound comprising the same transition metal of the crystalline transition metal as one component of the crystalline intermetallic compound, the crystalline intermetallic compound being capable of alloying with lithium; and
   carbon,
   wherein the crystalline transition metal exists in a phase structurally separated from the crystalline intermetallic compound capable of alloying with lithium, and
   wherein the transition metal in the crystalline intermetallic compound and the crystalline transition metal are less than 45 wt % based on the total weight of the crystalline transition metal and the crystalline intermetallic compound capable of alloying with lithium.

20. The lithium battery of claim 19, wherein the crystalline transition metal comprises a transition metal incapable of alloying with lithium.

* * * * *